(12) United States Patent
Briongos et al.

(10) Patent No.: US 11,775,360 B2
(45) Date of Patent: Oct. 3, 2023

(54) CACHE-BASED COMMUNICATION FOR TRUSTED EXECUTION ENVIRONMENTS

(71) Applicant: NEC Laboratories Europe GmbH, Heidelberg (DE)

(72) Inventors: Samira Briongos, Heidelberg (DE); Claudio Soriente, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/671,619

(22) Filed: Feb. 15, 2022

(65) Prior Publication Data

US 2023/0168954 A1    Jun. 1, 2023

Related U.S. Application Data

(60) Provisional application No. 63/284,649, filed on Dec. 1, 2021.

(51) Int. Cl.
*G06F 9/54* (2006.01)
*G06F 9/32* (2018.01)
*G06F 9/30* (2018.01)

(52) U.S. Cl.
CPC .......... *G06F 9/546* (2013.01); *G06F 9/30047* (2013.01); *G06F 9/30145* (2013.01); *G06F 9/321* (2013.01); *G06F 9/542* (2013.01)

(58) Field of Classification Search
CPC ................................ G06F 9/544; G06F 9/546
USPC .................................................. 719/312, 313
See application file for complete search history.

(56) References Cited

U.S. PATENT DOCUMENTS

| | | | | |
|---|---|---|---|---|
| 10,552,344 | B2* | 2/2020 | Rozas | G06F 3/0619 |
| 10,565,129 | B2* | 2/2020 | Schuster | G06F 12/128 |
| 10,867,092 | B2* | 12/2020 | Caspi | G06F 12/1009 |
| 11,347,542 | B2* | 5/2022 | Xia | G06F 21/64 |
| 2021/0144170 | A1* | 5/2021 | Ganapathy | H04L 63/1475 |
| 2021/0306304 | A1* | 9/2021 | Hwang | G06F 21/10 |

* cited by examiner

*Primary Examiner* — Andy Ho
(74) *Attorney, Agent, or Firm* — Leydig, Voit & Mayer, Ltd.

(57) ABSTRACT

A method executes inter-enclave communication via cache memory of a processor. The method includes: instantiating a first enclave such that it is configured to execute a first communication thread, which is configured to read/write data to the cache memory; instantiating a second enclave such that it is configured to execute a second communication thread, which is configured to read/write data to cache memory; executing, by the first enclave, the first communication thread to send message data to the second enclave, executing the first communication thread comprising writing the message data to the cache memory; and executing, by the second enclave, the second communication thread to receive the message data. Executing the second communication thread can include: monitoring the cache memory to determine whether the data message is being sent; and based upon determining the data message is being sent, reading from the cache memory to receive the data message.

13 Claims, 4 Drawing Sheets

CACHE-BASED COMMUNICATION FOR TRUSTED EXECUTION ENVIRONMENTS

CROSS-REFERENCE TO RELATED APPLICATION

Priority is claimed to U.S. Provisional Patent Application No. 63/284,649, filed on Dec. 1, 2021, the entire disclosure of which is hereby incorporated by reference herein.

FIELD

The present disclosure relates to a method, device, and computer-readable medium for cache-based communication for trusted execution environments.

BACKGROUND

Trusted execution environments (TEEs)—such as Intel software guard extensions (SGX)—enable applications to run in isolation from any other software on the same platform—i.e., run in an "enclave," including in isolation from an operating system (OS) (e.g., Microsoft Windows). Furthermore, applications running in a TEE enclave benefit from encrypted and authenticated storage—also known as "sealing" and cryptographic mechanisms—also known as "remote attestation"—that allow remote third parties to verify the software and hardware configuration of the application and its platform.

The present inventors have recognized that many current TEEs—such as Intel SGX—do not offer the possibility for two or more enclaves to directly communicate. Instead, communication between enclaves may only be possible through costly calls to the operating system (OS)—e.g., an out call (OCALL) or an enclave call (ECALL) OCALL/ECALL—that, in turn, require costly context switches to transfer the execution from one enclave, to the operating system, and onto another enclave.

Executing an OCALL requires a fixed and non-negligible time. Therefore, if the communication requires multiple OCALLs, then the performance is greatly degraded. To give an idea about the magnitude of this degradation, consider that an OCALL or an ECALL can take between 8,000 and 10,000 clock cycles. Thus, transferring a 2 kilo-byte (KB) buffer takes 10,000 clock cycles to execute the OCALL at the sender enclave, an additional 10,000 clock cycles for the ECALL at the receiving enclave, and finally, 1,500 cycles to read the buffer itself. As such, the time to transfer small amounts of data is largely dominated by the OCALL/ECALL operations.

SUMMARY

An embodiment of the present disclosure provides a method that executes inter-enclave communication via cache memory of a processor. The method includes: instantiating a first enclave such that it is configured to execute a first communication thread, which is configured to read/write data to the cache memory; instantiating a second enclave such that it is configured to execute a second communication thread, which is configured to read/write data to cache memory; executing, by the first enclave, the first communication thread to send message data to the second enclave, executing the first communication thread comprising writing the message data to the cache memory; and executing, by the second enclave, the second communication thread to receive the message data. Executing the second communication thread can include: monitoring the cache memory to determine whether the data message is being sent; and based upon determining the data message is being sent, reading from the cache memory to receive the data message.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Aspects of the present disclosure provide, inter alia, improvements to trusted execution environments (TEEs)—such as Intel SGX, which lack the ability to exchange information in a fast and reliable way. For example, aspects of the present disclosure solve this problem of the state of the art TEEs by using a cache as a channel for fast and reliable data transmissions across enclaves.

Aspects of the present disclosure provide a faster and reliable way to exchange data messages (particularly short data messages) between two enclaves running on the same machine (e.g., same processor). For example, in an aspect of the present disclosure, shared hardware resources (e.g., the L1 cache) are used for data transfer, thereby avoiding costly system calls.

At high level, one or more aspects of the present disclosure leverage the core private level one (L1) cache as a communication channel between two processes (e.g., threads) running on the same core. One enclave process (sender) signals the start of the communication process by writing to a fixed cache location, and then writes the data to be exchanged in other specific cache locations. The other enclave process (receiver) is notified and retrieves the information by reading data from those cache locations.

Aspects of the present disclosure leverage the time difference between read operations that fetch data from cache (cache hit) and read operations that fetch data from main memory (cache miss).

Aspects of the present disclosure enable fast communication between two enclaves on the same platform. State of the art enclaves have no means to communicate but to go through the operating system. Aspects of the present disclosure, provide a means of communication that does not go through the operating system.

Aspects of the present disclosure improve the state of the art by providing a mechanism to exchange information between TEEs in a fast and reliable way. Aspects of the present disclosure provide substitute for using shared memory with TEEs, which requires additional hardware resources (that are not available in every application, e.g., Intel SGX).

A first aspect of the present disclosure provides a method for cache based communication for trusted execution environments. The method includes one or more of the following: allocating two enclaves on the same core such that the two enclaves share a cache, comprising a plurality of cache sets, and dedicate one cache set for signaling purposes and N cache sets for encoding the message; encoding the message in the N cache sets by splitting the message into groups of log 2(L) bits (each set holding L lines) and filling as many cache lines of the cache sets as specified by the corresponding group of bits; and/or decoding the message by measuring access times and checking how many lines are filled with the sender's data.

A second aspect of the present disclosure provides a method for inter-enclave communication via cache memories. The method includes at least one of: requesting a particular core allocation of the enclaves to the operating system; implementing a counting thread that increments a counter variable at each CPU cycle; and/or implementing a communication thread that writes as many cache lines in each set as specified by the bits of the message to be transmitted to send a message. A reading operation is performed analogously to a receiving operation.

A third aspect of the present disclosure provide a system configured to perform the method according to the first or second aspect. A fourth aspect of the present disclosure provides a non-transitory computer readable medium, storing instructions, which when executed by one or more processors, causes the method according to the first or second aspect to be performed.

According to a first aspect, the present disclosure provides a method for inter-enclave communication via cache memory of a processor. The method includes: instantiating a first enclave such that the first enclave is configured to execute a first communication thread, which is configured to read or write data to the cache memory; instantiating a second enclave such that the second enclave is configured to execute a second communication thread, which is configured to read or write data to cache memory; executing, by the first enclave, the first communication thread to send message data to the second enclave, executing the first communication thread comprising writing the message data to the cache memory; and executing, by the second enclave, the second communication thread to receive the message data. Executing the second communication thread includes: monitoring the cache memory to determine whether the data message is being sent; and based upon determining the data message is being sent, reading from the cache memory to receive the data message.

The processor may include a plurality of cores, and instantiating the first enclave may include configuring at least the first communication thread to execute on a first core of the plurality of cores. The instantiating the second enclave may include configuring at least the second communication thread to execute on the first core.

The cache memory may include at least a level one cache associated with the first core. The first communication thread and the second communication thread may be configured to read or write data to the level one cache associated with the first core.

The cache memory may include a plurality of cache sets. The method may further include: designating one of the cache sets as a signaling cache set; and designating N of the cache sets as N communication cache sets. Executing the first communication thread may include writing on the signaling cache set to notify the second enclave that the message data is being transmitted.

The message data may include B bits. Each of the N communication cache sets respectively may include L lines. Executing the first communication thread may include: splitting the B bits of the message data into a plurality of chains of log 2(L) bits; and writing each of the chains into a respective one of the N communication cache sets.

Executing the first communication thread may include: after writing the last of the chains into the N cache sets, writing on the signaling cache set to notify the second enclave that the message data has been completely transmitted; and decoding the message by measuring access times and checking how many lines are filled with the sender's data.

Instantiating the first enclave may include configuring the first enclave to execute a timer thread that is configured to count each cycle of the processor. Monitoring the cache memory may include: measuring a time for reading data in the signaling cache set using the timer thread; upon detecting a change in the reading time, reading the data in the signaling cache; and based upon the data read from the signaling cache, determining that the data message is being sent.

Reading from the cache memory to receive the data message may include sequentially decoding each of the N communication cache sets to determine N chains of bits of the message data and sequentially appending the N chains of bits to assemble the data message.

Instantiating the first enclave may include configuring the first enclave to execute a timer thread that is configured to count each cycle of the processor. The message data may include B bits. Each of the N communication cache sets respectively may include L lines. Reading from the cache memory may include: (a) clearing a message register and a set counter; (b) determining a current cache set of the N communication cache sets based on the set counter; (c) measure an access time for each of the L lines in the current cache set; (d) determine that a write to the current cache set has completed based on the access time; (e) determine what number of the L lines are occupied in the current cache set; (f) decode a sub-set of the B bits based on the determined number of occupied lines in the current cache set; (g) append the sub-set of the B bits to the message register; (h) determine whether the current cache set is a final cache set of the N communication cache sets; (i) based upon determining that the current cache set is not the final cache set incrementing the set counter and repeating operations b-h; and (j) based upon determining that the current cache set is the final cache set determining the message register as the complete message.

The first enclave may not execute a call to the operating system to send the message data to the second enclave, and the second enclave may not execute a call to the operating system to receive the message data from the first enclave.

According to a second aspect, the present disclosure provides a processor having a plurality of cores and a cache memory, the processor being configured to execute a method for inter-enclave communication via the cache memory. The method may be according to one or more embodiments of the first aspect, describe above.

In an embodiment, the method executed by the processor includes: instantiating a first enclave such that the first enclave is configured to execute a first communication thread, which is configured to read or write data to the cache memory; instantiating a second enclave such that the second enclave is configured to execute a second communication thread, which is configured to read or write data to cache memory; executing, by the first enclave, the first communication thread to send message data to the second enclave, executing the first communication thread comprising writing the message data to the cache memory; and executing, by the second enclave, the second communication thread to receive the message data. Executing the second communication thread may include: monitoring the cache memory to determine whether the data message is being sent; and based upon determining the data message is being sent, reading from the cache memory to receive the data message.

Instantiating the first enclave may include configuring at least the first communication thread to execute on a first core of the plurality of cores. Instantiating the second enclave may include configuring at least the second communication thread to execute on the first core.

The cache memory may include at least a level one cache associated with the first core. The first communication thread and the second communication thread may be configured to read or write data to the level one cache associated with the first core.

The level one cache may include a plurality of cache sets. The processor may be configured to execute the method further including: designating one of the cache sets as a signaling cache set; and designating N of the cache sets as N communication cache sets, and wherein executing the first communication thread comprises writing on the signaling cache set to notify the second enclave that the message data is being transmitted.

According to a third aspect, the present disclosure provides a tangible, non-transitory computer-readable medium having instructions thereon which, upon being executed by one or more hardware processors, alone or in combination, provide for execution of the method according to one or more embodiments of the first aspect of the present disclosure.

The above and other features of the present disclosure are further described below in connection with the figures depicting exemplary embodiments of the present disclosure. The present disclosure, however, is not limited to the specific embodiments described herein. All features described and/or illustrated herein can be used alone or combined in different combinations.

Figure 1:
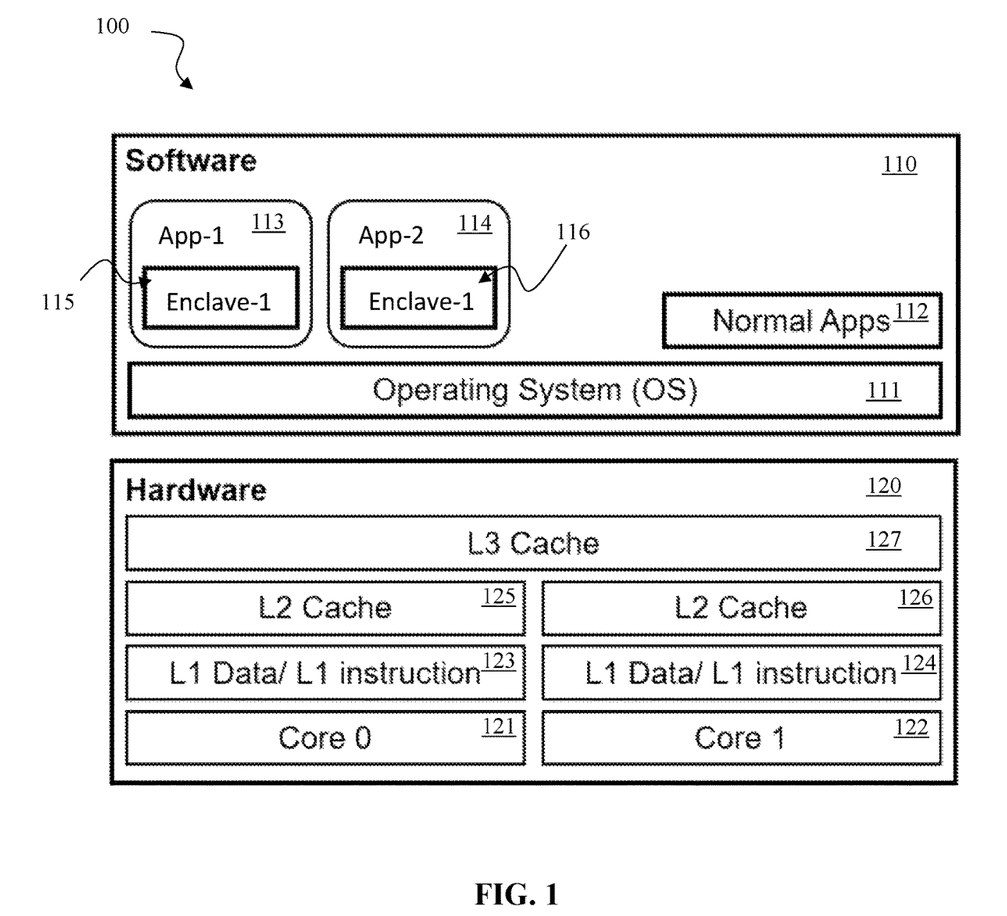
FIG. 1 illustrates a system model with TEE enclaves.

FIG. 1 depicts a system model 100 of TEE enabled machine, which includes software components 110 and hardware components 120. The TEE enabled machine may be deployed as a processing system, such as a personal computer, a mobile device, or a server. While aspects of the present disclosure may be described herein primarily in relation to their implementation in software or hardware, a person of ordinary skill in the art would understand that aspects of the present disclosure may be variously implemented in hardware and/or software. For example, while embodiments may discuss one feature as being implemented only in software, such features may also be implemented partially or entirely in hardware (and vice versa).

The software components 110 of the system model 100 include an operating system (OS) 111. The operating system (OS) 111 is a program that acts as an interface between a user of the system and the system resources (e.g., the hardware components 120). For example, the operating system provides an environment in which a user may execute applications (or programs), and provides a bridge between the applications and the data processing done at the hardware level (e.g., with hardware components 120). The operating system (OS) 111 can manage the system's resources (e.g., resource allocation, instantiation, and communication between components).

The hardware components 120 of the system model 100 shown in FIG. 1 illustrate aspects of a processor configured as a central processing unit (CPU). The present disclosure is not limited to only the depicted hardware components 120, for example, hardware components of a system may have multiple processors, each with multiple cores, system memory (e.g., random access memory (RAM)), primary storage (e.g., a hard disk or solid state drive), and communication hardware.

In FIG. 1, the processor hardware components 120 include two cores, Core 0 121 and Core 1 122, and cache memory. The cache memory may be a hardware cache used by the processor that is located physically and operationally close to a processor core, thereby enabling a reduction in an average cost (e.g., in time or energy) to access data from memory—as compared to accessing data stored "further" from the core, such as in RAM or primary storage. Cache memory is also generally smaller and faster memory, as compared to other system memory. The cache memory may have a hierarchy of multiple cache levels, with separate instruction-specific and data-specific caches.

In FIG. 1, the cache memory has a three level hierarchy—level 1 (L1) cache, level 2 (L2) cache, and level 3 (L3) cache.

Level 1 (L1) cache may be the fastest memory that is present in a system, but is also generally the smallest (in terms of storage size). In terms of priority of access, the L1 cache has the data a processor core is most likely to need while completing a certain task. The size of the L1 cache depends on the processor (e.g., 32 KB). A low latency (e.g., 4 clock cycles) is associated with accessing data from the L1 cache. The L1 cache may be split into a portion allocated for storing data (L1 Data) and a portion allocated for storing instructions (L1 Instruction).

Level 2 (L2) cache is generally a medium speed cache, and is generally slower (e.g., 11 clock cycle latency) and larger (e.g., 256 KB) than the L1 cache. The L2 cache may generally be used as a buffer between the L1 cache and the L3 cache.

Level 3 (L3) cache is generally the slowest (e.g., a 39 clock cycle latency) and the largest (e.g., 8 MB) cache in the three-level cache hierarchy. The L3 cache generally captures recent system data being accessed (e.g., read/write) by the processor.

An L1 cache and an L2 cache may be individually associated with each core of the processor. For example, an instance of the L1 cache may be located at (or near) its respective processor core. An instance of the L2 cache may be located on the same physical chip as its respective processor core, and physically near that core. The L3 cache is generally shared among multiple cores.

In the embodiment of FIG. 1, each core has its own L1 and L2 cache and the cores share an L3 cache. Specifically, the processor hardware components 120 include two cores, Core 0 121 and Core 1 122, which are associated with their respective L1 and L2 caches, and a shared L3 cache. More particularly, Core 1 has its own L1 cache 123 and L2 cache 125, Core 2 has its own L1 cache 124 and L2 cache 126, and Core 1 and Core 2 share an L3 cache 127.

As described above, aspects of the present disclosure provide a faster and more reliable way to exchange data between trusted execution environments (TEEs) running on the same TEE enabled machine, as compared to the state of the art (e.g., state of the art TEEs communicating via the OS). Aspects of the present disclosure also provide a more adaptable and less complex way to exchange data between TEEs running on the same TEE enabled machine as compared to the state of the art (e.g., the state of the art TEEs preconfigured with shared memory).

The software components 110 and hardware components 120 in FIG. 1 are that of a trusted execution environment enabled system. For example, the hardware components 120 may include trusted execution environment enabled processor hardware and instructions sets, and the software components 110 may include an operating system with trusted execution environment extensions, and be configured to instantiate and run trusted applications.

The present disclosure draws a distinction between "trusted" applications and "normal" applications. In the nomenclature of the present disclosure, "trusted" applications are those applications which are executed in a trusted execution environment (TEE) also called an enclave. To be "trusted", means that all TEE related assets (e.g., resources, code, support code, etc.) have been instantiated in such a way that the initial state of those assets are to be as expected from the perspective of the designers (e.g., everything is signature checked, immutable, or held in isolation). Further, this initial state can be verified by the programmer of the code (e.g. via remote attestation) and it is guaranteed that only the code running inside the TEE can access and modify its own private data, i.e. it is isolated from external interferences. "Normal" applications are those applications that do not execute in a TEE and do not otherwise share the required qualities to be "trusted." In some implementations, "normal" applications are known in the art as applications which are executed in a rich operating system execution environment. In the embodiment of FIG. 1, the software components 110 may include several instantiated normal applications 112.

The embodiment of FIG. 1 illustrates features and advantages of the present disclosure with respect to communication between two TEEs (Enclave 1 115 and Enclave 2 116), each having a respective calling application (App-1 113 and App-2 114) executed thereon (at least partially). A person of ordinary skill in the art, however, would recognize that other implementations, such as with more than two TEEs, are within the present disclosure.

In the embodiment of FIG. 1, Enclave-1 115 and Enclave-2 116 are running on the system and intend to establish direct communication between each other—i.e., a communication channel that does not use the operating system (OS) 111 as a go-between. Accordingly, the operating system (OS) 111 of an embodiment of the present disclosure schedules Enclave-1 115 and Enclave-2 such that one or more threads of each TEE enclave share a hardware resource to which they perform memory access For example, in a preferred embodiment, to enable such enclave-to-enclave communication, the operating system (OS) 111 schedules Enclave-1 115 and Enclave-2 116 in such a way that one or more threads of both enclaves that are going to perform the memory accesses are allocated on the same core (e.g., Core 0). That is, at least two threads—one from each enclave—share the same core. An advantage of this preferred embodiment includes enabling particularly fast communication between the enclaves (e.g., orders of magnitude faster communication than state of the art communication channels that use the OS as a go-between).

By scheduling both Enclave-1 115 and Enclave-2 116 to perform memory accesses with the same core (e.g., Core 0), the enclaves can be enabled to use the fast-accessible L1 cache (e.g., Level 1 Cache 123) or L2 cache (e.g., Level 2 Cache 124) to transmit information between the enclaves. This is because only the same core has access to these caches. Accordingly, a particularly preferred embodiment of the present disclosure uses the L1 cache of the assigned core to transmit information across the enclaves. Because the L1 cache is the fastest accessible memory available to the processor, this embodiment provides excellent communication advantages.

Embodiments of the present disclosure, however, are not limited to using a particular processor cache or a single core. Embodiments may use any other cache level to transmit information across the enclaves. For example, two enclaves running on different cores may use system-wide L3 cache as a communication channel. While, the communication delay increases at higher-level caches, the communication remains faster than the state of the art that communicates via the OS. Further, this embodiment has the advantage that it does not require that the OS makes an allocation to a specific core.

Figure 2:
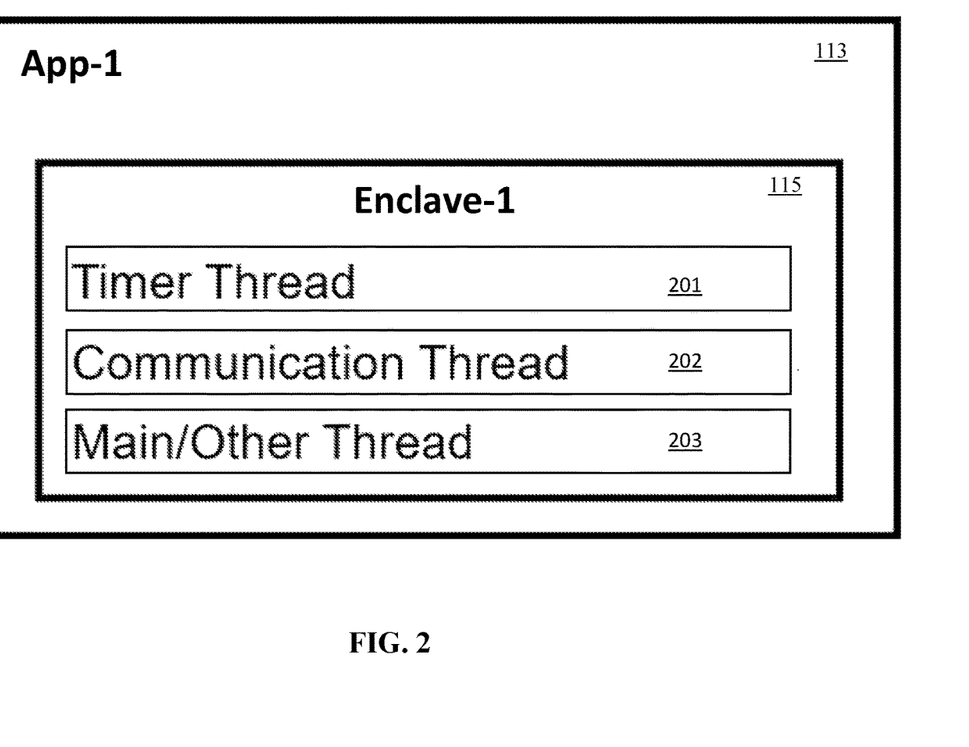
FIG. 2 illustrates aspects of a trusted application executed on a TEE enclave.

FIG. 2 shows an exemplary layout of an enclave according to aspects of the present disclosure. For ease of illustration, FIG. 2 shows a layout of the Enclave-1 115 from FIG. 1, in which trusted application is executed (at least partially) and the App-1 113 that calls it.

According to the embodiment of FIG. 2, the enclave includes two auxiliary threads—(1) a timer thread 201; and (2) a communication thread 202. These auxiliary threads are in addition to main/other threads 203 an enclave programmer aims to include (e.g., at least a main thread that would be in charge of carrying out the intended computation of the enclave in accordance with the trusted application). These two auxiliary threads are used to implement preferred aspects of the present disclosure. The communication thread 202 offers a service or an application programming interface (API) to the main thread, which may be called to either send data to or receive data from another enclave. The timer thread 201 supports the communication thread 201 with time measurements (e.g., by counting clock cycles).

According to one or more embodiments, in a case where the enclave acts only as a sender, the enclave may only use the communication thread 202. In a case where the enclave acts as a receiver, the enclave may use both the communication thread 202 and the timer thread 201.

In an embodiment of the present disclosure, the timer thread 201 is configured as a process that runs permanently and continuously increments a shared variable T As a result, the value of T increments by one (approximately) at each processor cycle (e.g., CPU cycle). Any other process with access to T—e.g., any of the enclave threads—can measure the cycles required to complete a specific operation OP. For example, the process could read T right before and right after executing the operation OP: the difference between the two values returned by reading T determines the number of cycles required to perform the specific operation OP.

In an embodiment of the present disclosure, the communication thread 202 controls the sending or receiving of information (data) via the processor cache (e.g., the L1 cache). The communication thread may be configured to directly address/access the processor cache, preferably the communication thread is configured to directly address/access a portion of the processor cache associated with a particular core of the processor, most preferably the L1 cache associated with the particular core.

According to the particular implementation, a communication thread may be employed according to the following:

Sender:
Fill signaling set;
Bits_sent = 0;

```
        l=log2(set_size);
        While (bits_sent < message_length){
                Val = Read next l bits of the message( );
                Fill val lines of the cache set;
                Bits_sent+=l;
        }
        Receiver:
        Read signaling set;
        If detection {
                Message = 0;
                For (i=0; i<N, i++){ //N are the communication sets
                        Received_data = 0;
                        For (j=0; j<lines_per_set, j++){
                                T1 = read(T);
                                Access cache line j of set i;
                                T2 = read(T);
                                If (T2-T1 > cache_hit_time){
                                        Received_data++;
                                }
                        }
                        Append received_data (as binary) to the Message
                }
        }
```

The above code implements a basic communication process. Further functionality may be incorporated with the process, including encrypting/decrypting a complete message for confidentiality.

Depending on the implementation, one or more of the cache in the processor may be divided into sets, and each set may allocate up to W "lines" (set-associative cache). For example, the L1 cache may be virtually addressed, which implies that, given a virtual address of any piece of data, it is possible to directly derive the location of that piece of data within the L1 cache. A typical L1 cache is 32 KB and each line holds 64 bytes, therefore it is divided into 512 lines organized as 64 sets of 8 lines. Bits 11 to 6 of the virtual address specify the L1 cache set.

Figure 3:
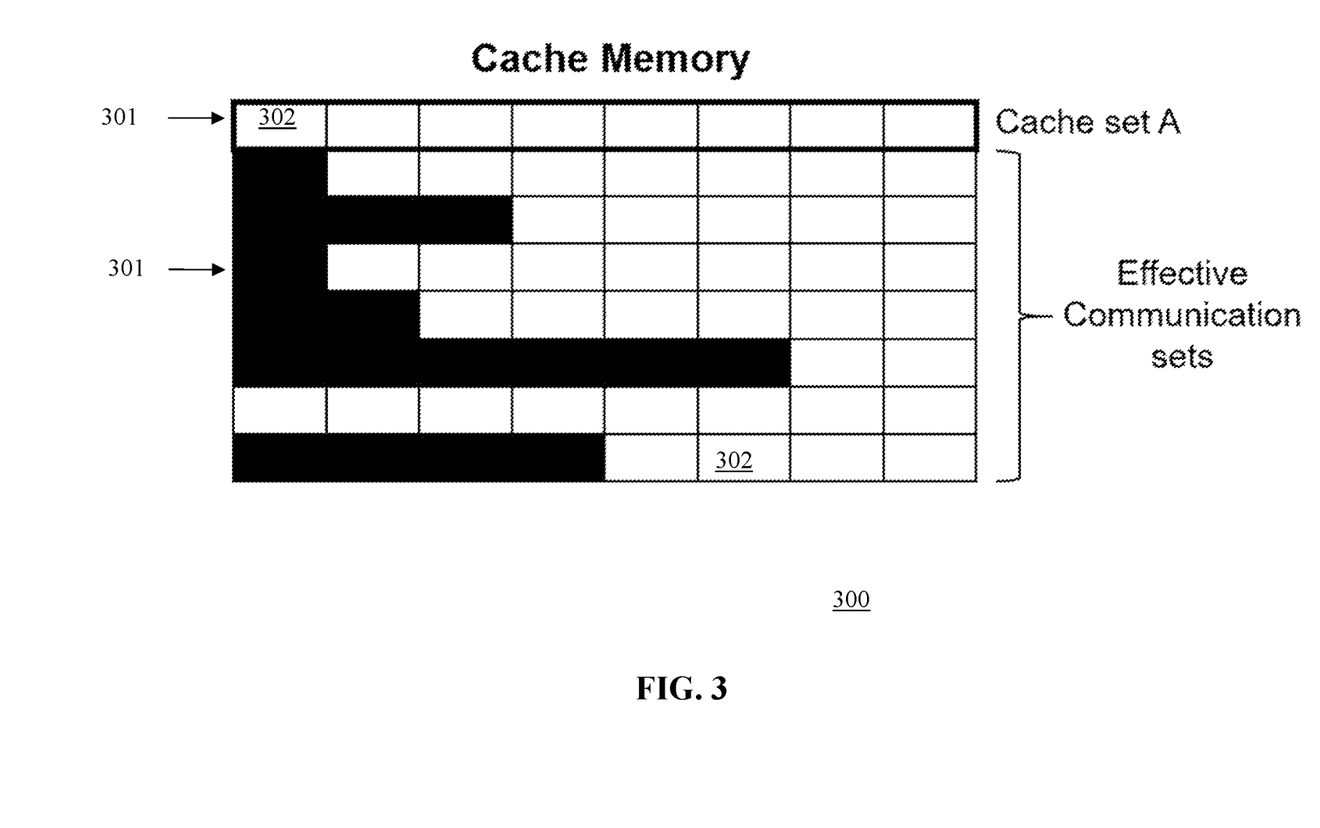
FIG. 3 illustrates an exemplary communication thread.

FIG. 3 shows a cache memory 300 consisting of a block of 8 cache sets 301, each cache set holding 8 cache lines 302. According to the present disclosure, enclaves may use the cache memory 300 to communicate between each other.

According to an embodiment, the cache memory 300 may be a predefined subset of a particular level of the processor cache memory (i.e., a subset of one of the L1, L2, or L3 cache, and not the entirety of the L1, L2 or L3 cache).

For a particular communication event, both the sender enclave and the receiver enclave may use synchronization. Synchronization can be achieved by dedicating one of the cache sets 301 for signaling. The particular cache set 301 being previously agreed between the enclaves (or otherwise predetermined). In FIG. 3, the cache set A is dedicated for the synchronization signaling. The remaining block of seven cache sets 301 are designated as effective communications sets.

The sender enclave (e.g., Enclave-1 115) writes on cache set A whenever it determines to send a message.

In an embodiment, in order to transmit the data, the whole cache 300 (this also includes the signaling set) is written by the sender enclave and then read by the receiver enclave. If the message (data) to be transmitted is larger than the capacity of the communication cache sets 301, the same procedure is started again. For example, after the first sub-set of the data is written by the sender enclave into the cache 300 and detected/read by the receiver enclave, a second sub-set of the data is written.

The receiver enclave (e.g., Enclave-2 116) may first fill the whole cache 300 and then constantly read (e.g., successively read one cache line, one after the other) on the cache set A to detect the beginning of a transmission (any detected change in the cache may indicate the beginning of a transmission). Filling the cache provides a known default state for the receiving enclave to compare against.

For example, a receiver enclave may fill the cache with data from a buffer it allocates on memory (the size of such buffer can be the cache size so there is a one-to-one mapping). The sender enclave can then remove the filled data to send the message, and subsequently the receiver enable is able to distinguish between misses (the data that the sender removed) and hits (the data the receiver originally placed there and is still in the cache).

Figure 4:
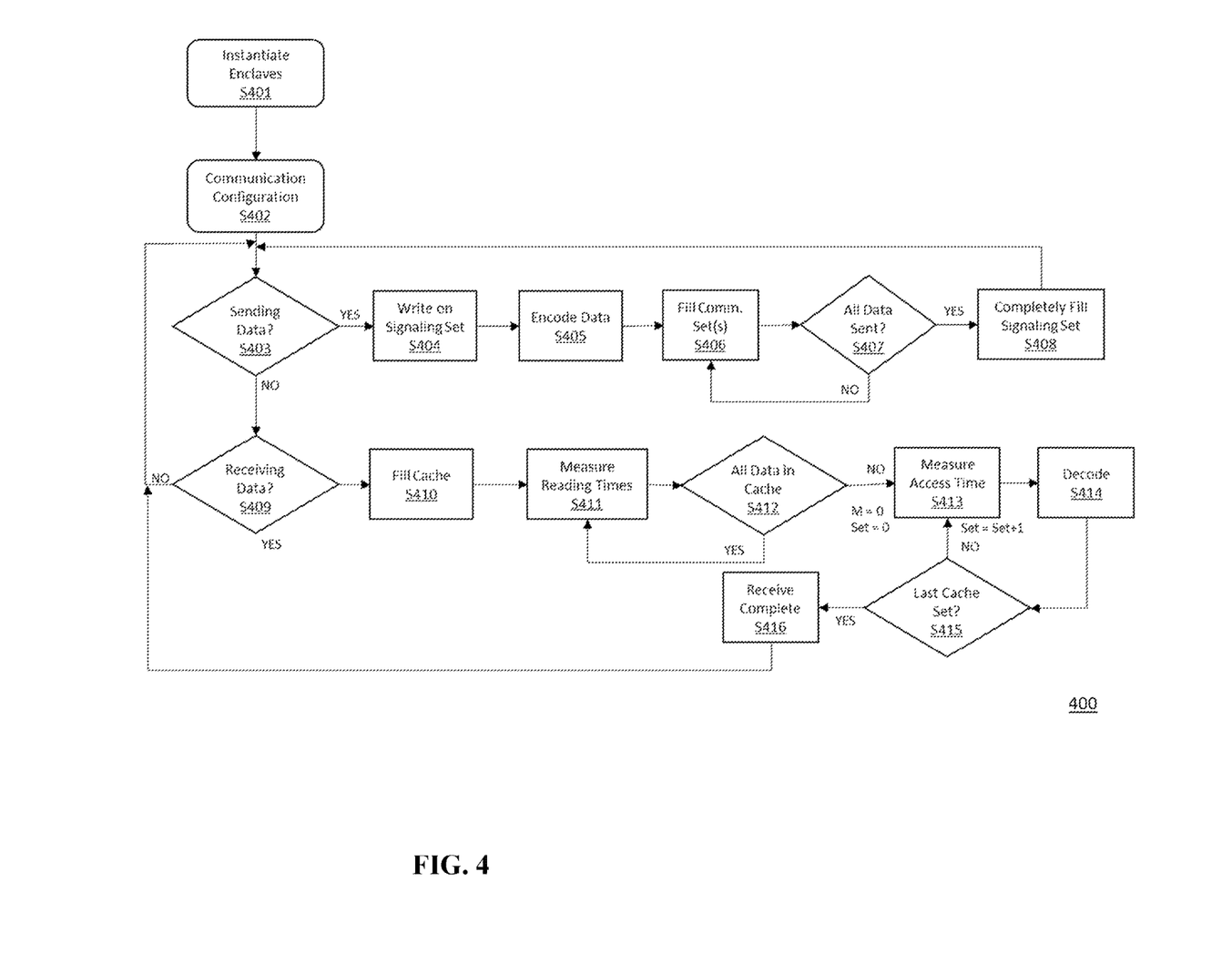
FIG. 4 illustrates a flow chart illustrating a method according to an aspect of the present disclosure.

FIG. 4 illustrates a method according to an embodiment of the present disclosure. In particular, FIG. 4 illustrates a method executed by a processor for performing an enclave instantiation and communication procedure according to an embodiment of the present disclosure.

In an initialization operation, the enclaves that are to communicate with each other are instantiated (S401). In an embodiment, the operating system (OS) instantiates the enclaves, in particular two enclaves, such that the enclaves have a communication thread, the communication thread targeting a particular level of the processor cache. In a particularly preferred embodiment, the OS allocates the respective communication threads of each enclave on the same core of the processor. In an embodiment, when the OS is instantiating the enclaves one or more of the enclaves may be instantiated with a timer thread. According to an embodiment, in a case where an enclave is configured only to send data to another enclave, that sending enclave may not be instantiated with a timer thread. In a case where an enclave is configured to at least receive data from another enclave, that receiving enclave is instantiated with a timer thread. The initialization operation (S401) may be performed only once.

A communication configuration operation (S402) may also be performed by the processor. In the communication configuration operation (S402), a particular cache set of the chosen cache is set to signal the start and/or end of a transmission—this cache set may be referred to as the signaling cache set. In an embodiment, the communication threads of the enclaves are operated to agree on a particular cache set to use (e.g., set A of L1 cache, as shown in FIG. 3). In another embodiment, the signaling cache set may be predefined, e.g., predefined by the OS. This communication configuration operation (S402) may be executed only once.

When an enclave determines that it wants to transmit a message (i.e., a message comprised of bits of data) to another enclave (S403), the enclave will write on the signaling cache set (S405) shared with the receiving enclave. For example, when Exclave-1 determines that it wants to send data to Enclave-2, Enclave-1 may write on cache set A of the L1 cache shared among Enclave-1 and Enclave-2.

After the sending enclave has determined that it wants to transmit a message, the sending enclave may encode the data of the message (S405). The sending enclave will then fill the communication cache sets (S406) until all data of the message has been sent (S407).

For example, a sending enclave can be configured to fill the communication cache sets according to a value it aims to transmit as the message (or a portion of the message). The sending enclave, may therefore encode the data of the message based upon the number of the communication cache sets S provided and the lines L that each of those communications cache sets S holds.

In a particularly preferred embodiment, for example, the sending enclave may encode the data and write the communication cache as follows. For a message for transmission having B bits of data, the sending enclave splits the B bits into C chains of bits of length log 2(L). The length value of the chains is an integer, and the number C is obtained as B/(log 2(L)), with L being the lines that each of the communication case sets S holds. The communication sets S are filled according to the value of the chain. That is, the number of lines filled in a set I, is given by the value of the Ci chain. For example, given the cache 300 in the example of FIG. 3, each cache set 301 holds 8 lines 302, meaning that each cache set 301 can encode 3 bits, and because the cache memory 300 has 7 communication cache sets, the cache memory 300 is capable of transmitting a maximum of 21 bits at a time. For further illustration, consider a message that is to be transmitted is the 21 bit sequence: "001011001010110000100." Here, the sending enclave fills "001", "011", "001", "010", "110", "000" and "100" cache lines 302 of each consecutive cache set 301, respectively— or if these values are expressed as decimal numbers, the sending enclave will fill 1, 3, 1, 2, 6, 0, and 4 cache lines of the corresponding cache sets.

Once all data of the message has been sent (S407), the sending enclave will completely fill the signaling set (S408), signaling the end of the transmission. For example, if the size of the message is greater than the amount of data that can fit into the communication cache sets, the sender enclave will not fill completely the signaling cache set until all of the data has been written into the communication cache sets, which will require multiple writes on at least one communication cache set of the cache memory. An incomplete signaling set of the cache, therefore, also provides a notification that more data is required to complete the transmission of the message.

When an enclave is not sending data, the enclave may be acting as a receiving enclave (S409). A receiving enclave may initialize the cache by filling the cache (S410). By filling the cache, the receiving enclave provides a default state for the cache for ease of monitoring for changes.

A receiving enclave may be actively listening to the signaling cache set, e.g., continually reading from the signaling cache set until a change is detected. When a change to the signaling cache set is detected, the receiving enclave knows that a message is or will be transmitted by another enclave. In the embodiment of FIG. 4, the receiving enclave monitors the signaling cache for a change by executing a loop that includes measuring reading times of the data in the signaling cache set (S411) and then checking whether all of the data is in the signaling cache set (S412) (e.g., all the data being in the signaling cache set can mean that the sender has not initialized the communication and that the receiver only sees cache hits). The reading times can be used for measuring access times to each of the cache lines in the signaling cache set. As long as the signaling cache set remains unchanged, i.e., filled, the receiving enclave will remain in this loop of measuring reading times (S411) and checking the signaling cache set (S412). Once, the receiving enclave detects a change in the signaling chase set—in this embodiment, determining the all of the data is not in the signaling cache set—the receiving enclave will consider this change a notification that a message is being transmitted by a sending enclave.

After receiving a notification that a message is being transmitted by detecting the change in the signaling cache set (S411), the receiving enclave may wait a predetermined time period (e.g., a few clock cycles) after receiving the notification before the receiving enclave starts monitoring (e.g., accessing and reading) the communication cache sets. This guards against overwriting the data that the sender aims to transmit.

The receiving enclave figures out the transmitted message by decoding the bits as the amount of the data that the sender has placed into each of the communication cache sets. Prior to decoding each communication cache set, the receiving enclave may measure access times to the data in each of the sets. Higher access times means that the sender has placed its own data in the cache.

More specifically, as shown in the embodiment of FIG. 4, the receiving enclave, may therefore, after determining a message is being transmitted (S412), enter a loop for methodically receiving and decoding the transmitted message (S413, S414, S415). Prior to entering the loop, the receiving enclave may initialize a message register M and a set counter Set to 0. For the current communication cache set—initially communication cache set 0, the receiving enclave will first measure an access time for each of the lines in the set (S413). By measuring the access time, the receiving enclave can determine whether the sending enclave has completed entering the message data in each line of the current communication cache set. The counting thread of the receiving enclave may be used to measure the access time in number of processor cycles.

Once the receiving enclave determines that the corresponding message data has been written in the current communication cache set, the receiving enclave will decode the corresponding bits of the transmitted message (S414). For example, the receiving enclave may read from the current communication cache set, and decode the corresponding bits of the message based on a number of occupied lines and then append the decoded bits to the message register M.

To illustrate, using the example in FIG. 3, the receiving enclave will measure 1 cache miss for the first cache set which it interprets as a "001" transmitted by the sending enclave. The receiving enclave will then append those 3 bits to the received message register M as the decoded bits from the current communication cache set.

After decoding the bits in the current communication cache set, the receiving enclave will determine whether the current communication cache set is the last communication cache set used for the transmitted message (S415)—i.e., to determine whether the transmitted message has been completely received. The receiving enclave may make this determination based on the status of the signaling cache set and/or the set counter Set. For example, the receiving enclave may, after decoding the current communication cache set, use the set counter Set to determine whether the current communication cache set is the last communication cache set in the cache memory. If it is not the last communication cache set, the receiving enclave will increment the set counter Set and renter the loop to check the access time of the lines of the new communication cache set (S413). If, however, set counter Set indicates that the current communication cache set is the last communication cache set in the cache memory, the receiving enclave may also consider the status of the signaling cache set. If the signaling cache set remains incomplete, the receiving enclave will rest the set counter Set to 0 and renter the loop. This state indicates that the number bits of the transmitted message is greater than the number of communication cache sets. If the signaling cache set is now completely full, the receiving enclave can determine that it has decoded the last communication cache set, and that the receipt of the transmitted message is complete (S416).

In connection with determining the message has been received, the receiving enclave may confirm receipt by writing to the same signaling cache set that the sender used to notify the beginning of the transmission of the message, e.g. if Enclave-1 wrote to the set A to start the communication, enclave 2 will write to A to acknowledge receipt.

The aforementioned procedure refers to a unidirectional communication process, i.e. the roles of the sender and receiver are predetermined prior to transmission. Embodiments of the present disclosure, however, are not so limited. For example, in one or more embodiments, bidirectional communication is supported by dedicating another extra cache set for signaling the start of the transmission. For example, the cache set A can be dedicated so that the Enclave-1 is enabled to notify Enclave-2 that it wants to transmit data, and another cache set B is dedicated so the Enclave 2 can send a similar notification to the Enclave-1 In this case, whichever enclave that notifies the communication first locks the channel until the message is sent.

Embodiments of the present disclosure provide improvements to processors, particularly trusted execution environment enabled processors by enabling direct communication between trusted execution environment enclaves executing trusted applications. For example, embodiments of the present disclosure provide for faster and simpler communication between trusted applications and trusted execution environment enclaves. According to the terminology of the present disclosure, "direct communication" between enclaves means that the enclaves communicate each using a respective thread of the respective enclave that directly addresses a single cache memory (e.g., L1, L2, or L3 cache memory), without using call to the operating system being executed on the processor (e.g., without using an OCALL and/or and ECALL). According to the terminology of the present disclosure, "cache memory associated with a core" means a cache memory comprised in a processor comprising the core and that the cache memory shares the same physical chip with the core (e.g., the cache memory is physically on the same substrate as the core of the processor executing at least one thread of each of the enclaves).

Embodiments of the present disclosure provide a particularly quicker communication speed (e.g., at least an order of magnitude fewer clock cycles) under scenarios with frequent data exchange where the data size is a few kilobytes as compared to the state of the art communication techniques that go through the OS (e.g., communication between enclaves using OCALLs and/or ECALLs of the OS).

While aspects of the present disclosure have been described with respect to a processor implemented as a central processing unit (CPU) with at least one core and a CPU cache memory, the present disclosure is not limited thereto. For example, a TEE enabled machine configured according to the present disclosure may include a plurality processors, which may be coupled to or include a plurality of memory (e.g., one or more non-transitory storage medium). The processors may be configured to communicate locally and/or remotely (e.g., via a network). Additionally, a person of ordinary skill in the art, would understand that aspects of the present disclosure are not limited to TEE enabled CPUs but aspects of the present disclosure may be implemented by other processors (e.g., field programmable gate arrays (FPGAs), application-specific integrated circuits (ASICs), or the like) extended to provide a trusted execution environment and execute trusted applications.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for inter-enclave communication via cache memory of a processor, the method comprising:
   instantiating a first enclave such that the first enclave is configured to execute a first communication thread, which is configured to read or write data to the cache memory;
   instantiating a second enclave such that the second enclave is configured to execute a second communication thread, which is configured to read or write data to cache memory;
   executing, by the first enclave, the first communication thread to send message data to the second enclave, executing the first communication thread comprising writing the message data to the cache memory; and
   executing, by the second enclave, the second communication thread to receive the message data, executing the second communication thread comprising:
      monitoring the cache memory to determine whether the data message is being sent; and
      based upon determining the data message is being sent, reading from the cache memory to receive the data message,
   wherein the cache memory comprises a plurality of cache sets,
   wherein the method comprises:
      designating one of the cache sets as a signaling cache set; and
      designating N of the cache sets as N communication cache sets, and
   wherein executing the first communication thread comprises writing on the signaling cache set to notify the second enclave that the message data is being transmitted.

2. The method according to claim 1,
   wherein the processor comprises a plurality of cores,
   wherein instantiating the first enclave comprises configuring at least the first communication thread to execute on a first core of the plurality of cores, and wherein instantiating the second enclave comprises configuring at least the second communication thread to execute on the first core.

3. The method according to claim 2,
wherein the cache memory comprises at least a level one cache associated with the first core,
wherein the first communication thread and the second communication thread are configured to read or write data to the level one cache associated with the first core.

4. The method according to claim 1,
wherein the message data comprises B bits,
wherein each of the N communication cache sets respectively comprises L lines, and
wherein executing the first communication thread comprises:
splitting the B bits of the message data into a plurality of chains of log 2(L) bits; and
writing each of the chains into a respective one of the N communication cache sets.

5. The method according to claim 4, wherein executing the first communication thread comprises:
after writing the last of the chains into the N cache sets, writing on the signaling cache set to notify the second enclave that the message data has been completely transmitted; and
decoding the message by measuring access times and checking how many lines are filled with the sender's data.

6. The method according to claim 1,
wherein instantiating the first enclave comprises configuring the first enclave to execute a timer thread that is configured to count each cycle of the processor, and
wherein monitoring the cache memory comprises:
measuring a time for reading data in the signaling cache set using the timer thread;
upon detecting a change in the reading time, reading the data in the signaling cache; and
based upon the data read from the signaling cache, determining that the data message is being sent.

7. The method according to claim 1, wherein reading from the cache memory to receive the data message comprises sequentially decoding each of the N communication cache sets to determine N chains of bits of the message data and sequentially appending the N chains of bits to assemble the data message.

8. The method according to claim 1,
wherein instantiating the first enclave comprises configuring the first enclave to execute a timer thread that is configured to count each cycle of the processor,
wherein the message data comprises B bits,
wherein each of the N communication cache sets respectively comprises L lines, and
wherein reading from the cache memory comprises:
a. clearing a message register and a set counter;
b. determining a current cache set of the N communication cache sets based on the set counter;
c. measure an access time for each of the L lines in the current cache set;
d. determine that a write to the current cache set has completed based on the access time;
e. determine what number of the L lines are occupied in the current cache set;
f. decode a sub-set of the B bits based on the determined number of occupied lines in the current cache set;
g. append the sub-set of the B bits to the message register;
h. determine whether the current cache set is a final cache set of the N communication cache sets;
i. based upon determining that the current cache set is not the final cache set incrementing the set counter and repeating operations b-h; and
j. based upon determining that the current cache set is the final cache set determining the message register as the complete message.

9. The method according to claim 1, wherein the first enclave does not execute a call to the operating system to send the message data to the second enclave, and the second enclave does not execute a call to the operating system to receive the message data from the first enclave.

10. A tangible, non-transitory computer-readable medium having instructions thereon which, upon being executed by one or more hardware processors, alone or in combination, provide for execution of the method of claim 1.

11. A processor comprising a plurality of cores and a cache memory, the processor being configured to execute a method for inter-enclave communication via the cache memory, the method comprising:
instantiating a first enclave such that the first enclave is configured to execute a first communication thread, which is configured to read or write data to the cache memory;
instantiating a second enclave such that the second enclave is configured to execute a second communication thread, which is configured to read or write data to cache memory;
executing, by the first enclave, the first communication thread to send message data to the second enclave, executing the first communication thread comprising writing the message data to the cache memory; and
executing, by the second enclave, the second communication thread to receive the message data, executing the second communication thread comprising:
monitoring the cache memory to determine whether the data message is being sent; and
based upon determining the data message is being sent, reading from the cache memory to receive the data message,
wherein the level one cache comprises a plurality of cache sets, wherein the processor is configured to execute the method further comprising: designating one of the cache sets as a signaling cache set and designating N of the cache sets as N communication cache sets, and wherein executing the first communication thread comprises writing on the signaling cache set to notify the second enclave that the message data is being transmitted.

12. The processor of claim 11,
wherein instantiating the first enclave comprises configuring at least the first communication thread to execute on a first core of the plurality of cores, and
wherein instantiating the second enclave comprises configuring at least the second communication thread to execute on the first core.

13. The processor of claim 12,
wherein the cache memory comprises at least a level one cache associated with the first core,
wherein the first communication thread and the second communication thread are configured to read or write data to the level one cache associated with the first core.

* * * * *